United States Patent [19]
Fuller

[11] 3,744,387
[45] July 10, 1973

[54] CAMERA WITH APPARENT IMAGE MOTION AND DIRECTION COMPENSATION

[75] Inventor: David L. Fuller, Atlanta, Ga.

[73] Assignee: Scripto, Inc., Atlanta, Ga.

[22] Filed: Oct. 8, 1971

[21] Appl. No.: 187,768

[52] U.S. Cl. ............................................. 95/12.5
[51] Int. Cl. ......................................... G03b 37/02
[58] Field of Search .................... 95/12.5, 50, 31; 355/52

[56] References Cited
UNITED STATES PATENTS

| | | | |
|---|---|---|---|
| 2,413,272 | 12/1946 | Wheelwright | 95/50 |
| 1,586,071 | 5/1926 | Cooke | 95/12.5 |
| 2,713,814 | 7/1955 | Sonne | 95/12.5 |
| 2,796,009 | 6/1957 | Doyle | 95/12.5 |
| 3,137,221 | 6/1964 | Watts | 95/31 |

*Primary Examiner*—John M. Horan
*Attorney*—Edward Taylor Newton, William J. Ormsby et al.

[57] ABSTRACT

A camera which compensates for apparent image motion due to the velocity component of an aircraft which is parallel to the ground surface employs a reciprocating film gate for this purpose. The film gate describes simple harmonic motion back and forth along a path relative to the camera lens and parallel to the earth's surface such that the at midpoint of such movement, where the film gate velocity is maximum, the film is positioned at the focal plane of the lens and exposure is made. The time period of the harmonic motion is fixed and the stroke of such motion is variable so that the maximum velocity of the film gate is also selectively variable to match it with the apparent image motion. The direction of the motion path is also selectively variable with relation to the lens so that the path may be adjusted to be parallel with the earth's surface despite the attitude of the aircraft (i.e. whether in level flight or in ascending or in descending mode). Film is advanced step-by-step through the film gate, the advance being made on the return motion of the film gate and the film being captured and held during forward motion of the film gate when the exposure is made.

21 Claims, 10 Drawing Figures

INVENTOR
DAVID L. FULLER 3,744,387

CAMERA WITH APPARENT IMAGE MOTION AND DIRECTION COMPENSATION

BACKGROUND OF THE INVENTION

In making aerial photographs from a low-flying aircraft travelling at substantial velocity, the apparent image motion of the ground surface due to the velocity component of the aircraft parallel to the earth's surface may be sufficiently great as to cause blurring of the image at the shutter speed required for proper exposure of the image. Also, difficulties are encountered when the attitude of the aircraft changes, i.e. there is a difference between the conditions of level flight, ascending flight or descending flight.

BRIEF SUMMARY OF THE INVENTION

The present invention is directed to a camera assembly which compensates for relative motion of the image with respect to the lens without requiring any compensatory motion, rotation or other movement to be imparted to the lens assembly for this purpose. Specifically, the camera assembly according to the present invention involves the utilization of a film gate means which is relatively movable with respect to the lens system and carries the film back and forth along a path in opposite directions on either side of an interim position whereat the film is located at the focal plane of the lens means, the velocity of movement at such interim position and the relative direction of the path of movement with respect to the lens means being selectively variable. The arrangement involves a swash plate assembly in which the angularity of the swash plate means is selectively adjustable thereby to vary the stroke imparted thereby to the film gate means of the camera assembly, the angular rotation of the swash plate means being constant thereby selectively to vary the instantaneous velocity of the film gate means at the interim position thereof in response to stroke changes. The assembly also incorporates guide means whereby to change the relative path of reciprocatory motion of the film gate means with respect to the lens means and this arrangement, although physically tied in with the swash plate means, nevertheless is capable of adjustment without affecting the stroke of the swash plate means.

A common drive assembly effects the motion of the swash plate means and in addition drives the shutter means for the lens system and, as well, controls the feeding and movement of a continuous strip of photosensitive film which is advanced step-by-step through the film gate means.

BRIEF DESCRIPTION OF THE DRAWING FIGURES

DETAILED DESCRIPTION OF THE INVENTION

Generally speaking, the camera assembly described herein is particularly adapted for aerial photography and the lens system employed is preferably that disclosed in copending applications Ser. No. 94,830 filed Dec. 3, 1970, now U.S. Pat. No. 3,669,527, and employing in general the principles disclosed in U.S. Pats. No. 3,251,266 and No. 3,361,512. The shutter assembly utilized preferably is that disclosed in copending application Ser. No. 187,772 filed Oct. 8, 1971, now U.S. Pat. No. 3,718,079. In the following description, the details of the lens assembly and of the shutter mechanism have been omitted in order to avoid burdening the present disclosure with such details and the subject matters of the aforesaid copending applications and patents are incorporated in the present disclosure herein by reference.

Figure 1:
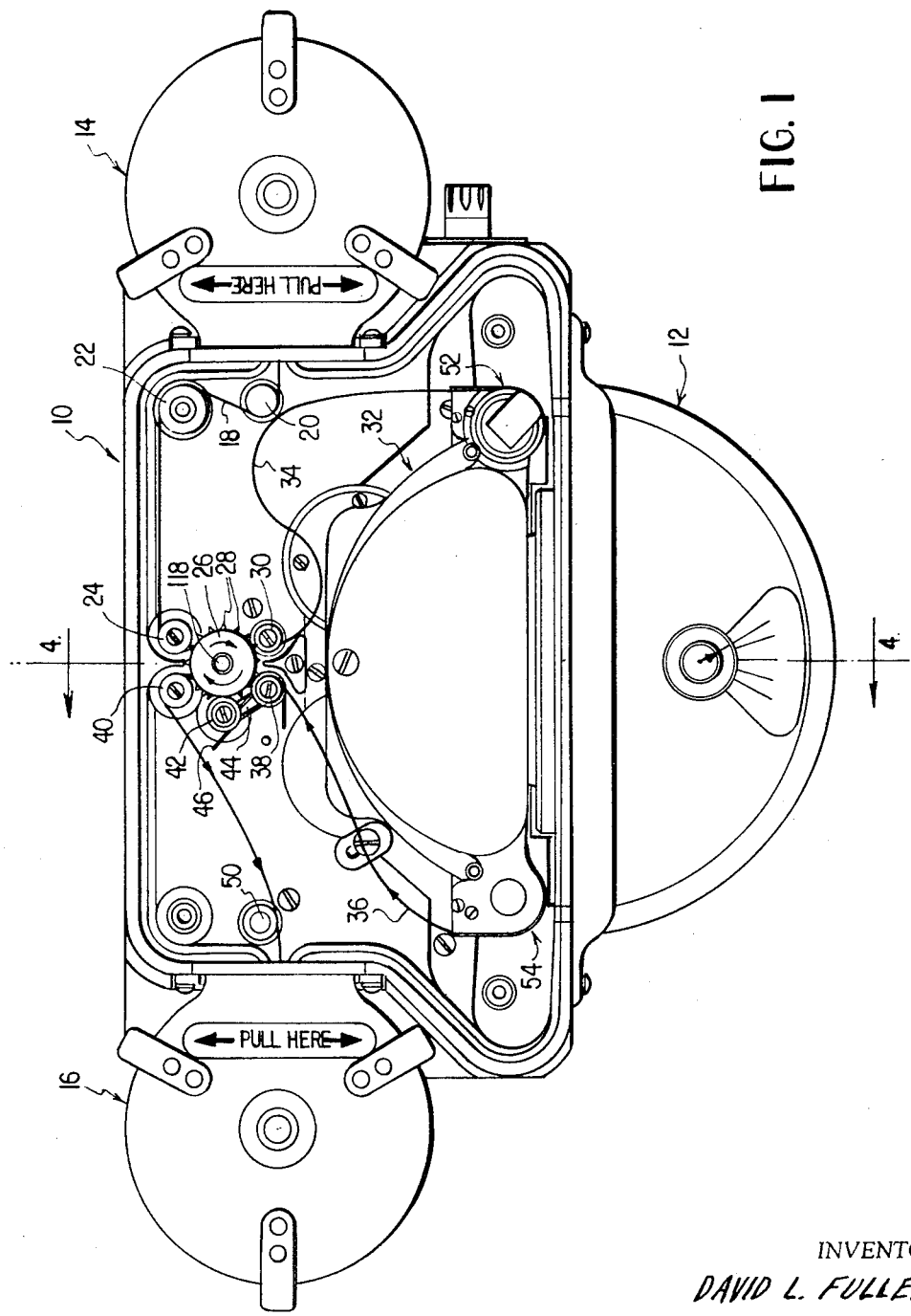
FIG. 1 is a port elevation of the camera assembly with the left-hand side cover removed and showing the threading of the film from the supply to the take-up spool and intermediately through the gate assembly.

With reference now particularly to FIG. 1, a port elevation of the camera assembly is shown with side cover removed. The camera body is indicated generally by the reference character 10 and secured to the bottom thereof is the lens housing indicated generally by the reference character 12, it being understood that the camera shown was specifically designed to operate while carried by an aircraft with the lens pointing downwardly. A housing 14 is adapted to receive a supply spool of film and the housing 16 contains a take-up spool for the film as will hereinafter be described with greater particularity. The film 18 issues from the supply spool within the housing 14 and is threaded over the two capstans 20 and 22 and then over the capstan 24 and then engages over the drive member 26 whose teeth 28 engage in the openings along the side edges of the film and the film then passes over the capstan 30 and then passes into the gate assembly indicated generally by the reference character 32.

The operation of the gate assembly forms an important part of the present invention inasmuch as the arrangement of component parts of the camera assembly as a whole is such that the gate assembly is reciprocated first in the direction to the left in FIG. 1, in the direction of the line of flight during which time the photograph is taken and then the gate assembly 32 is returned to the right in FIG. 1 to prepare for taking the next picture. During the time the gate assembly 32 is shifted to the left, movement of the film through the gate assembly is arrested as will hereinafter be pointed out and when the gate is returned to the right, the film is released and is advanced within the gate. It will be understood that the gate assembly 32 is the only entity which moves, the camera body 10 remaining stationary and to accommodate for such motion of the gate, the film is threaded to provide a substantial amount of slack therein as is indicated by the reference character 34 on the inlet side to the gate 32.

The film issues from the gate 32 as indicated by the reference character 36 and is threaded over the capstan 38 back over the other side of the drive member 26 and thence over the capstan 40. The spring pressed capstan 42 is provided positively to assure engagement of the film against the member 26, the capstan 42 being carried by an arm 44 pivoted to the axis shaft of the capstan 38 and being biased by the spring 46 into engagement with the film and so to press it against the member 26. After issuing over the capstan 40, the film is threaded over the further capstan 50 and then enters the take-up spool housing 16. The gate assembly is provided with drive wheel members in the regions indicated generally by the reference characters 52 and 54 and, for loading purposes, a hand crank 56 is provided in connection with the driving member 52.

Figure 3:
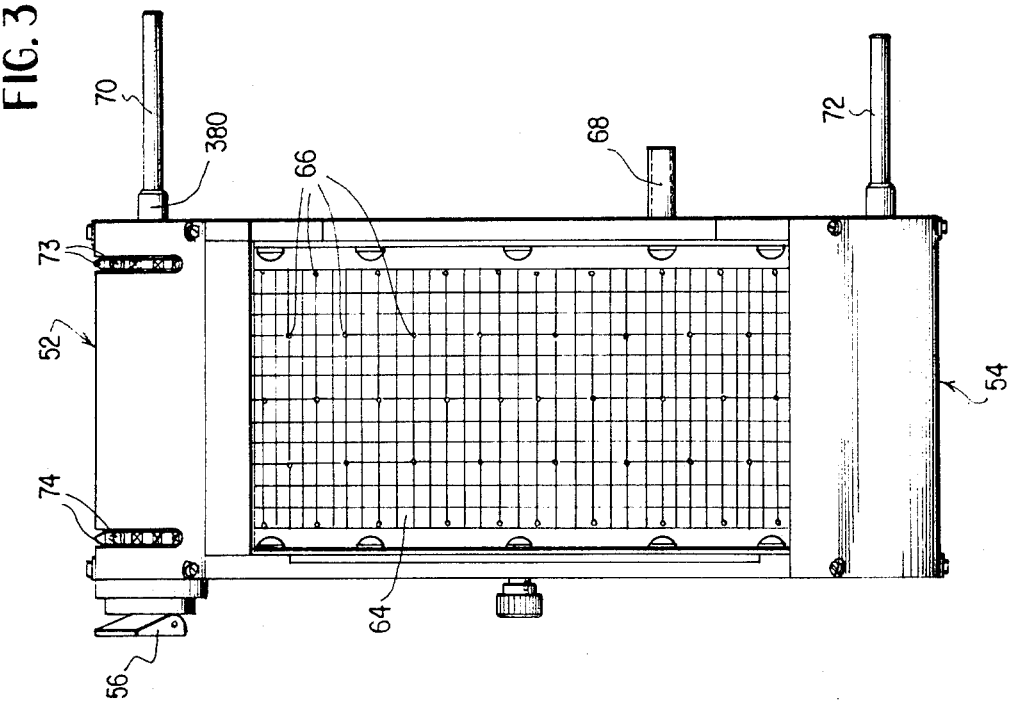
FIG. 3 is a bottom plan view of the gate assembly looking through the open lower side thereof.
Figure 2:
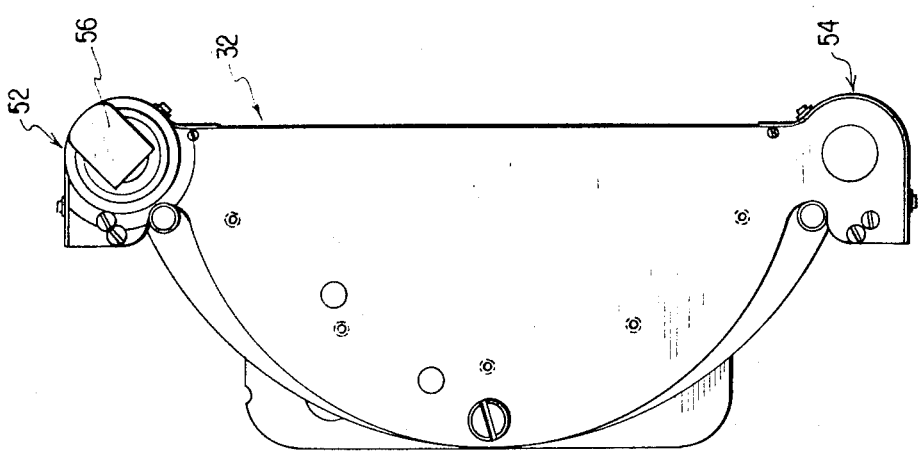
FIG. 2 is a side view of the gate assembly.
Figure 4:
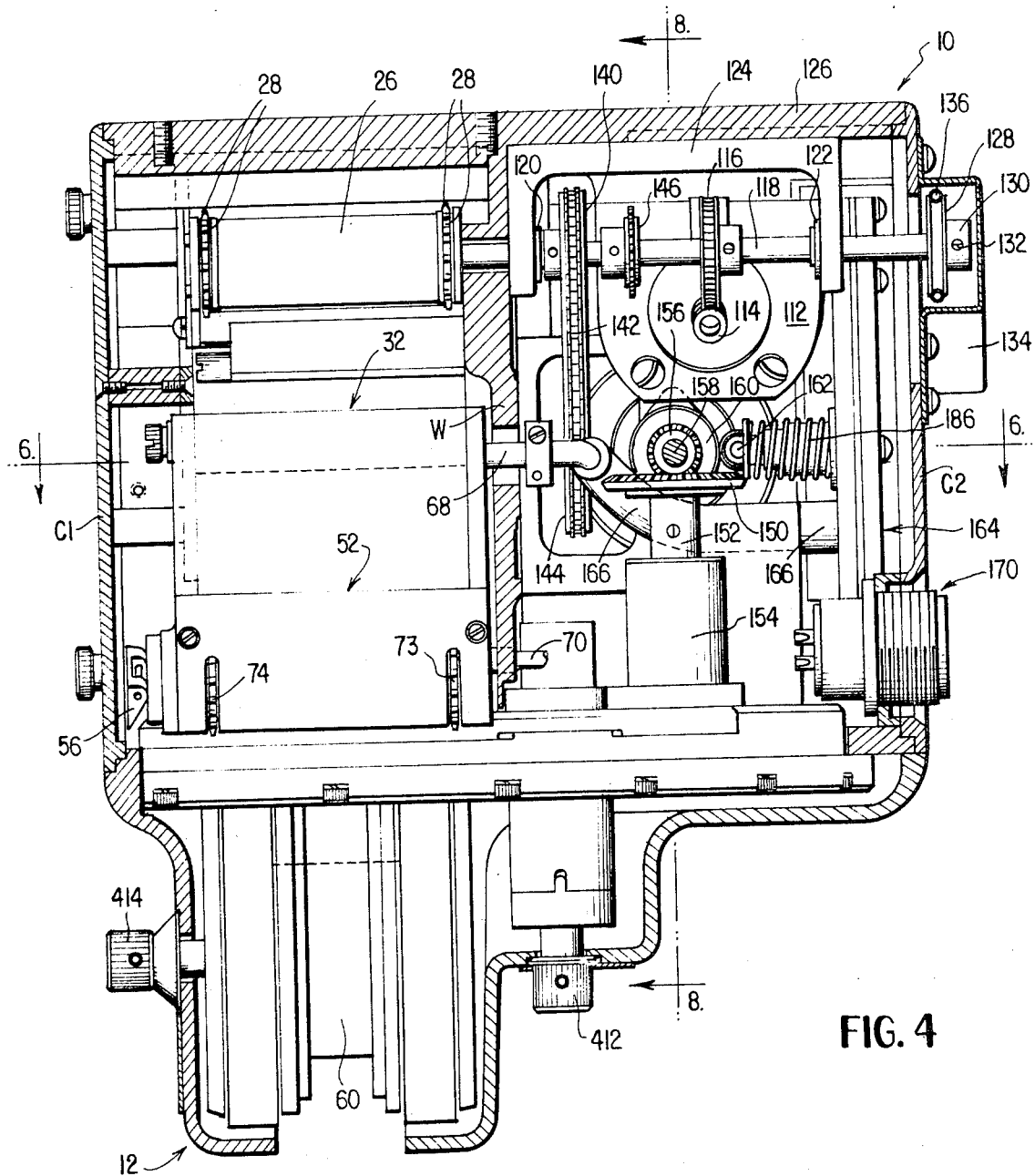
FIG. 4 is a transverse section taken generally along the plane of section line 4—4 in FIG. 1 and illustrating internal details on enlarged scale.

The lens system utilized in the camera of the present invention of the type disclosed in my prior patents mentioned above, the front lens of which is indicated by the reference character 60 in FIG. 4 and as disclosed in the aforesaid patent, the image plane of the lens system is arcuate. Accordingly, the upper side of the film gate 32, as is shown in FIG. 2 (left-hand side), is arcuate and on the inner side thereof there is provided an arcuate grid 64 as is shown in FIG. 3, looking through the open lower side of the gate. The grid is formed as the front wall of a vacuum chamber and such front wall or side has a series of apertures or openings 66 therein by means of which the film may be subjected to a vacuum action serving to capture and hold the film and also to assure that the film is lying flat against and in close proximity to the front side of the gate member 64 which conforms to the curved shape of the focal plane of the lens system. For this purpose, the gate chamber is communicated with a source of vacuum, as will hereinafter be described, by means of the conduit 68. The conduit 68 issues from the starboard side of the gate assembly 32 and, additionally, the drive shafts 70 and 62 for intermittently advancing the film through the gate assembly also issue from the starboard side of the gate assembly 32. The drive shaft 70 is provided with sprocket wheels having teeth 73 and 74 engaging the opposite side edges of the film and projecting through the perforations therein and a similar arrangement of sprockets is provided on the shaft 72 to effect the drive of the film through the gate. As will hereinafter appear, the two members 70 and 72 are utilized also to guide the gate assembly 32 during its reciprocatory movement as previously described and it is a particular feature of this invention that the line or path along which reciprocation is effected can be altered so that the film gate may be caused to reciprocate in a path which is parallel to the ground surface, even when the line of flight of the aricraft is such that the aircraft is ascending or descending.

Figure 5:
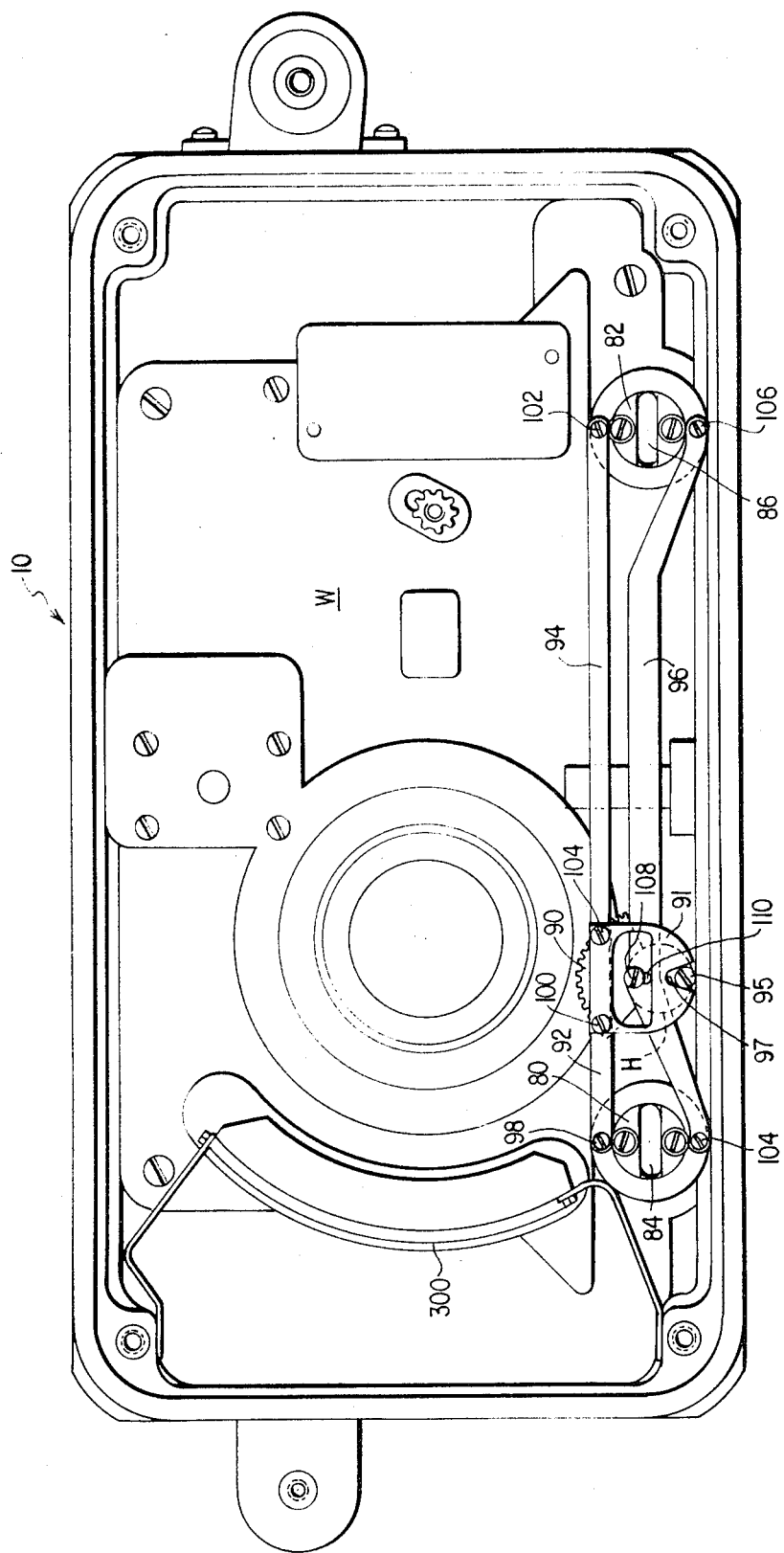
FIG. 5 is a starboard elevation of the camera assembly (lens housing removed) and showing details of the guide means for the film gate with other components removed for the sake of clarity.

To appreciate the manner in which the gate assembly is caused to reciprocate along the proper plane, reference is had to FIG. 5. For convenience in correlating the various Figures, it should be noted that the central wall structure W in FIG. 4 forms a major supporting structure for the camera body 10, and that FIG. 1 is a view looking into the left-hand (port) side of FIG. 4 with the side cover C1 removed whereas FIG. 5 is a starboard view with the cover C2, as well as the majority of components, removed. In FIG. 5, a pair of cylindrical guide members 80 and 82 are shown, same being rotatably mounted in the camera case and these members being provided with elongate slots 84 and 86 respectively which receive the members 72 and 70 respectively of the gate assembly, see FIG. 3. The members 80 and 82 act merely as guides, the reciprocatory drive being effected through the medium of a hollow drive pin 88 projecting into the starboard side of the gate assembly, see particularly FIG. 6. At any rate, it will be apparent from FIG. 5 that when the guides 80 and 82 are in the positions shown, the line of reciprocatory motion of the gate will be horizontal with respect to this Figure whereas as the two guide members 80 and 82 are rotated in unison otherwise to align their guide slots 84 and 86, the gate assembly will be guided to reciprocate along other and different paths. In order to effect the unison rotary adjustment of the members 80 and 82, a gear sector 90 is provided which is in mesh with an adjustment gear hereinafter described and which drives a carrier plate 91 linked by the elements 92 and 94 to the respective guides 80 and 82, the integral link 96 also being provided interconnecting the two guides 80 and 82. The links 92 and 94 respectively are pivoted to the plate 91 and the sector 90 translates the plate 91 through the medium of the drive pin 95 operating in the V-shaped notch 97 of the plate 91. The sector 90 is rotatably mounted by means of the hub H which is journalled in the wall W, it being appreciated that the members 80 and 82 are also journalled in the wall W. The pins 98 and 100 effect the connections for the link 92 and the link 94 is similarly connected to the plate 91 and the sector 90 by means of the pins 102 and 104. Pivotal connection to the opposite ends of the integral guide link 96 is effected by the pins 104 and 106 and a guide pin 108 is carried by the sector and passes through an elongate slot 110 in the member 96, as shown. The geometry and arrangement of linkages as such as positively and accurately to assure unison rotary motion of the two guides 80 and 82 as the sector 90 is rotated through the small incremental angles as effected by the adjustment device hereinafter described. It is to be noted, in this respect, that the carrier plate "floats" with respect to the sector 90 in that there is really no direct connection therebetween. Movement of the sector 90 shifts the link 96 in one direction through the pin and slot arrangement 108, 110 while the plate 91 is shifted in the opposite direction through the pin and notch arrangement 95, 97. The net result is a very accurate unison rotation of the two guides 80 and 82 so that their slots 84 and 86 always will be directed along lines which are either parallel or coincidental.

Figure 9:
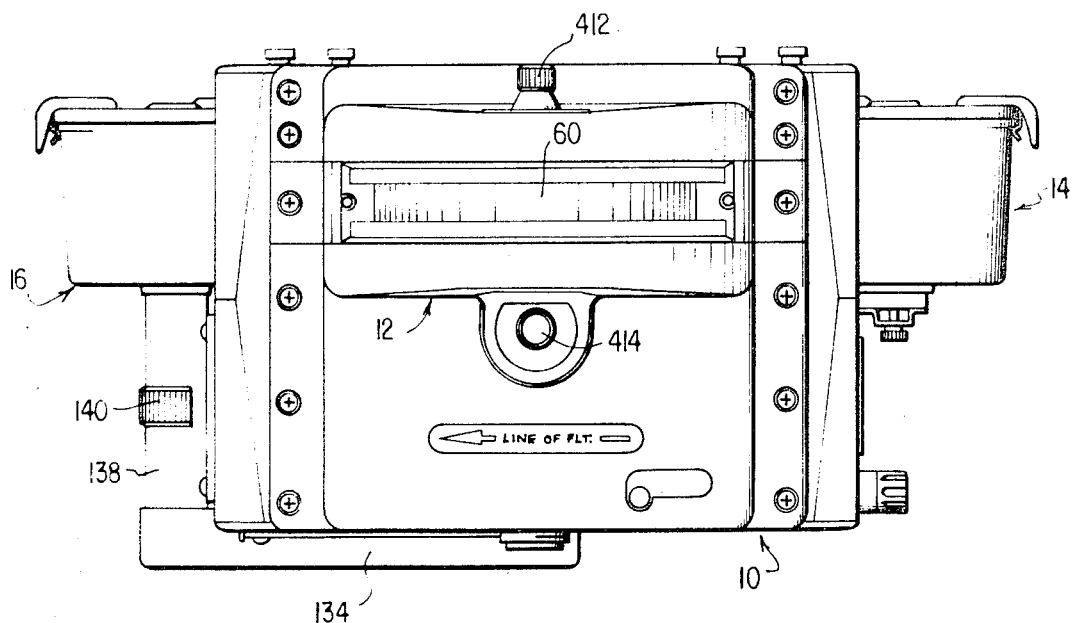
FIG. 9 is a bottom plan view of the camera assembly on reduced scale.

Turning now to FIG. 4 wherein some of the general layout of drive mechanism may be seen, the main drive motor is indicated therein by the reference character 112 and will be seen to be provided with an output shaft having a worm 114 thereon which is in mesh with a worm wheel 116 on the transverse main drive shaft 118 journalled in suitable bearings at 120 and 122 mounted in the bracket assembly 124 secured to the top wall 126 of the camera body 10. The left-hand extension of this main drive shaft 118 as shown in FIG. 4 is slip-fittedly drive-connected to the member 26 (see also FIG. 1) which effects the main drive for the film feeding assembly. The right-hand extension of this shaft as shown in FIG. 4 is provided with a pulley 128 whose hub 130 is removably received on the shaft 118 and is detachably coupled thereto as by a set screw 132, this pulley lying outboard of the cover C2 as shown and being covered by a drive housing member 134. The belt or cable 136 which may be in the form of an endless coiled spring is trained over the pulley 128 and passes through the housing 134 and trains over a driven pulley (not shown) coupled to a shaft which projects into the take-up spool casing 16 and is housed within the casing portion 138, see particularly FIG. 9. A hand wheel 140 is fixed to the take-up shaft so that film take-up may be effected manually during the initial film threading operation as will be obvious to those in the art. The drive to the take-up shaft is by means of the pulley and belt or cable system as described so as inherently to provide for slippage or, in effect, overrunning clutch action at the take-up spool since the film advancing mechanism is discontinuous or intermittent during each cycle of operation.

The main drive shaft 118 is also provided with a sprocket 140 over which an endless chain 142 is trained, this chain extending to a sprocket 144 hereinafter more particularly described. The shaft 118 is provided with a further sprocket 146 whose function and purpose will also be described hereinafter.

Also shown in FIG. 4 is the bevel gear 150 effecting the drive to the shutter mechanism of the camera lens system and the shaft to which the hub 152 of this bevel gear is attached is coupled through a spring-loaded, lost motion connection to the shaft drive for the shutter mechanism indicated by the reference character 154.

The drive to the bevel gear 150 is effected through the bevel gear 156 which is secured to the countershaft 158 hereinafter described and this countershaft also carries an eccentric or cam 160 against which a cam follower 162 engages to operate the plunger of a vacuum pump indicated generally by the reference character 164. The outlet port of this vacuum pump is connected by means of a flexible tube 166 which is connected to the aforesaid vacuum chamber of the film gate means 32 through the nipple 68.

FIG. 4 also shows the cable connector 170 mounted adjacent cover C2 and by means of which electrical connection to the internal components which are operated electrically is made.

Figure 6:
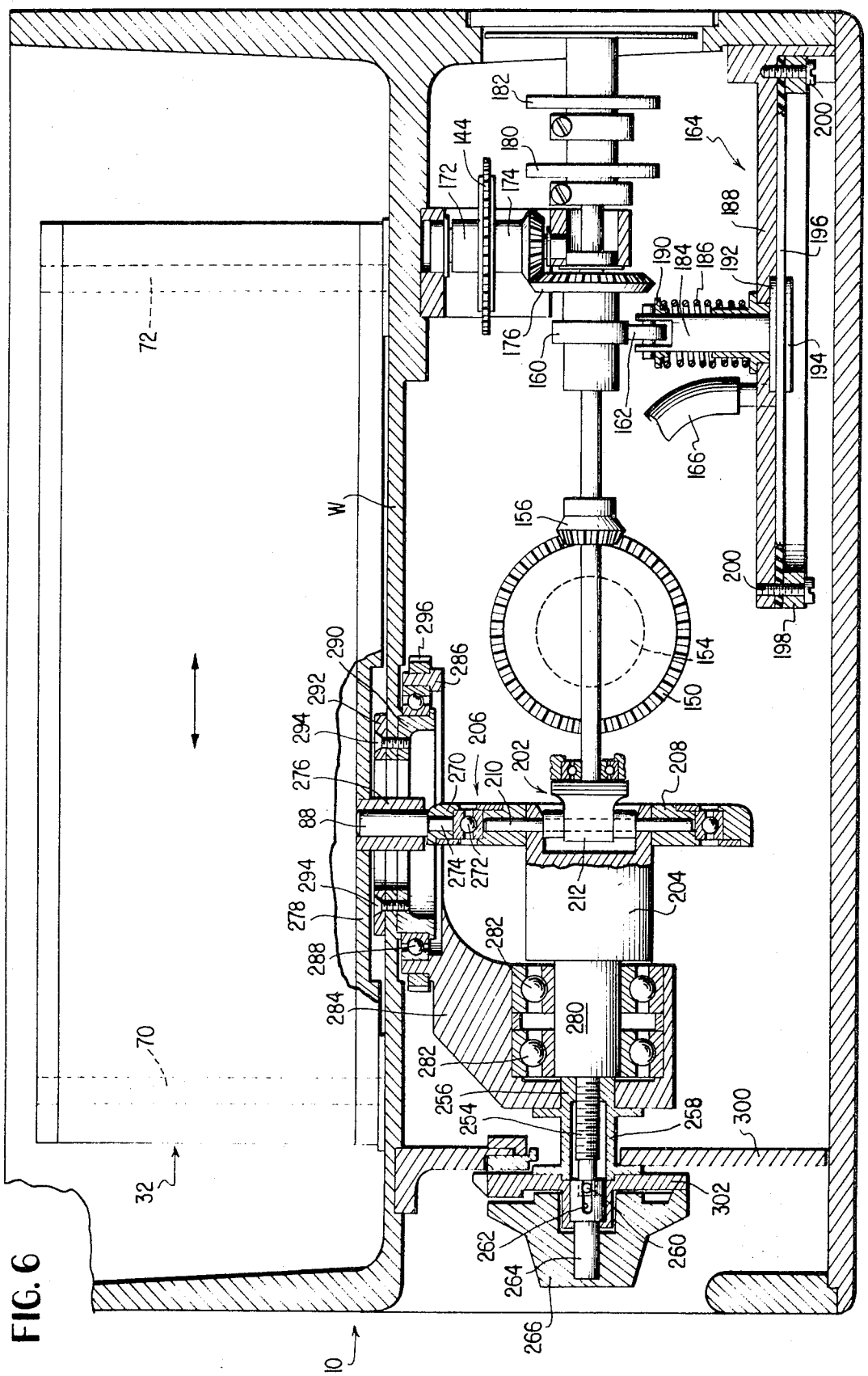
FIG. 6 is a horizontal section taken substantially along the plane of section line 6—6 in FIG. 4 and showing certain details of the swash plate means and of the drive assembly but portions of the drive assembly being omitted for the sake of clarity.

Further details of the drive mechanism may be seen in FIG. 6 wherein it will be appreciated that the aforementioned sprocket 144 has its hub 172 fixed to a stub shaft which also carries a bevel gear 174 which is in mesh with the bevel gear 176 connected to the shaft 158 thereby to complete the drive between the main drive shaft 118 and the shaft 158. In FIG. 6, the bevel gear 150 and hub 152 have been omitted for the sake of clarity.

FIG. 6 also shows details of the construction of the section pump 164. As illustrated, the plunger 184, which carries the cam follower 162, normally is urged outwardly by means of the compression spring 186 acting at one end against the side plate 188 of the pump and at its other end against a suitable washer 190 axially fixed on the plunger 184. The plunger 184 projects into the interior of the pump and is provided with washer elements 192 and 194 which sandwich the flexible diaphragm 196 therebetween. In the central portion of this diaphragm and whose peripheral edges are fixed and sealed against the side plate 188 by means of the clamping ring 198 are associated fasteners 200, substantially as is shown.

FIG. 6 also illustrates the fact that the shaft 158 is provided with a universal joint assembly indicated generally by the reference character 202 which imparts drive to the hub 204 of a swash plate assembly indicated generally by the reference character 206.

The swash plate assembly includes an inner ring 208 which is pinned to the hub 204 by means of the cross pin 210 which also acts as one pivot axis of the universal joint assembly 202 and, for this purpose, passing rotatably through the universal joint cross 212 as illustrated. It will be appreciated, of course, that the universal joint 202 requires only one cross pin inasmuch, as it will be hereinafter described, the universal action thereof is required to operate only in one plane.

Figure 8:
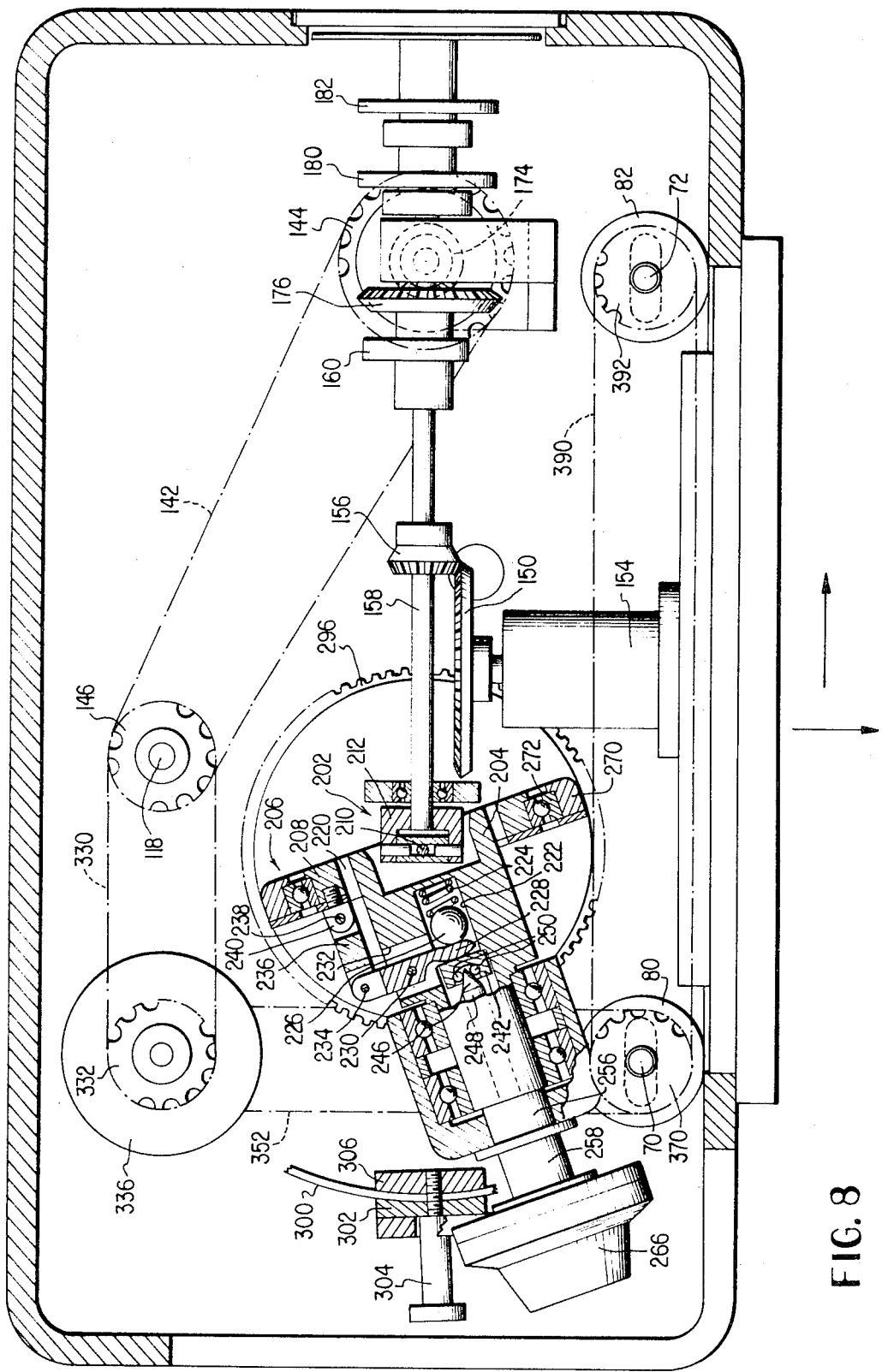
FIG. 8 is a vertical section taken generally along the plane of section line 8—8 in FIG. 4 and showing further details of the swash plate means.

The inner ring 208 of the swash plate assembly may be swung about the axis of the cross pin 210 to establish the effective stroke imparted by the swash plate, suitable clearance being provided as indicated at 220 in FIG. 8 for this purpose. FIG. 8 also shows the means by which the stroke imparted by the swash plate may be varied selectively by the operator. In this connection, it will be seen that the hub 204 is provided with a recess 222 receiving a compression spring 224 and a ball member 226 which presses against the end portion 228 of an arm pivoted as at 230 to the hub. The arm passes through a radial opening 232 in the hub and its outer end is pivoted by the pin 234 to a link member 236 which, in turn, is pivoted by a pin 238 to the anchoring member 240 secured to the inner ring 208 as shown. On the side opposite the ball 226, a thrust button 242 bears against the inner portion 228 of the arm. The tapered end 246 of an axially adjustable pin 248 bears against the thrust button 242 through the intermediary of the thrust balls 250. The opposite end of this pin or shaft 248 is threaded as indicated by the reference character 254 in FIG. 6 and engages in the threaded nut portion 256 of the collar 258. The free end of the pin or shaft 248 is provided with a drive pin 260 which projects laterally from opposite sides of the shaft and which is received in the elongate slot or notches 262 of the drive sleeve 264. The drive sleeve is provided with a operating knob 266 as shown and the knob 266 is operated to withdraw the pin or shaft 248 axially and allow the spring 224 and associated ball 226 to pivot the arm 228 thereby to tilt the inner ring 208 about the cross shaft or pin 210 thereby to impart the swash plate action.

The outer ring 270 of the swash plate is rotatably mounted on the inner ring 208 thereof by means of the ball bearing 272 and this outer ring 207 receives the reduced inner end portion 274 of the previously mentioned drive pin 88 which imparts the reciprocatory motion to the film gate means 32. The drive pin 88 is surrounded by a bushing 276 which operates within an elongate slot in the side wall 278 of the film gate, the elongation of this slot being from top to bottom of the film gate means to prevent the necessary lost motion in this direction which occurs when the film gate means is aligned for reciprocation along paths other than that in which the two guide slots 84 and 86 are aligned with each other.

The extension 280 of the hub 204 which houses the inner end of the pin or shaft 248 is surrounded by suitable ball bearings 282 which mount the entire hub assembly within the housing 284 which mounts the nut and collar 258 and which is provided with a laterally offset extension 286 by means of which the housing is mounted on the wall W of the camera body. This extension 286 mounts a ball bearing 288 carried by the ring 290 which, together with the ring 292, sandwiches the wall W therebetween under the influence of the fasteners 294 as shown in FIG. 6 so as suitably to mount the housing 284 as mentioned. The outer surface of the extension 286 carries a gear 296 which forms part of the mechanism for effecting adjustment of the guide members 80 and 82.

To this end, it will be appreciated that the housing 284 is rotatable about an axis, due to the presence of the bearing 288, which is coincidental with the axis of the drive 88 and of the cross pin 210 when the same is alinged in the fashion indicated in FIG. 6 whereby the housing 284 may be rotated without affecting the stroke of the swash plate means 206. To effect this arcuate or rotary adjustment of the housing 284, an arcuate guide plate 300 is provided having a longitudinally extending slot therein through which the collar 258 projects and, in addition, there is provided a carrier plate 302 through which a clamping member 304 is projected, to cooperate with a clamping plate 306 on the other side of the member 300 as shown in FIG. 8. The clamping plate 302, as is shown in FIG. 6, connects with the knob assembly and the collar 258 so that these, and together with them the housing 284, are held in selected positions under the action of the clamping member 304 which, when released, will allow arcuate movement of the housing 284 as described.

Figure 7:
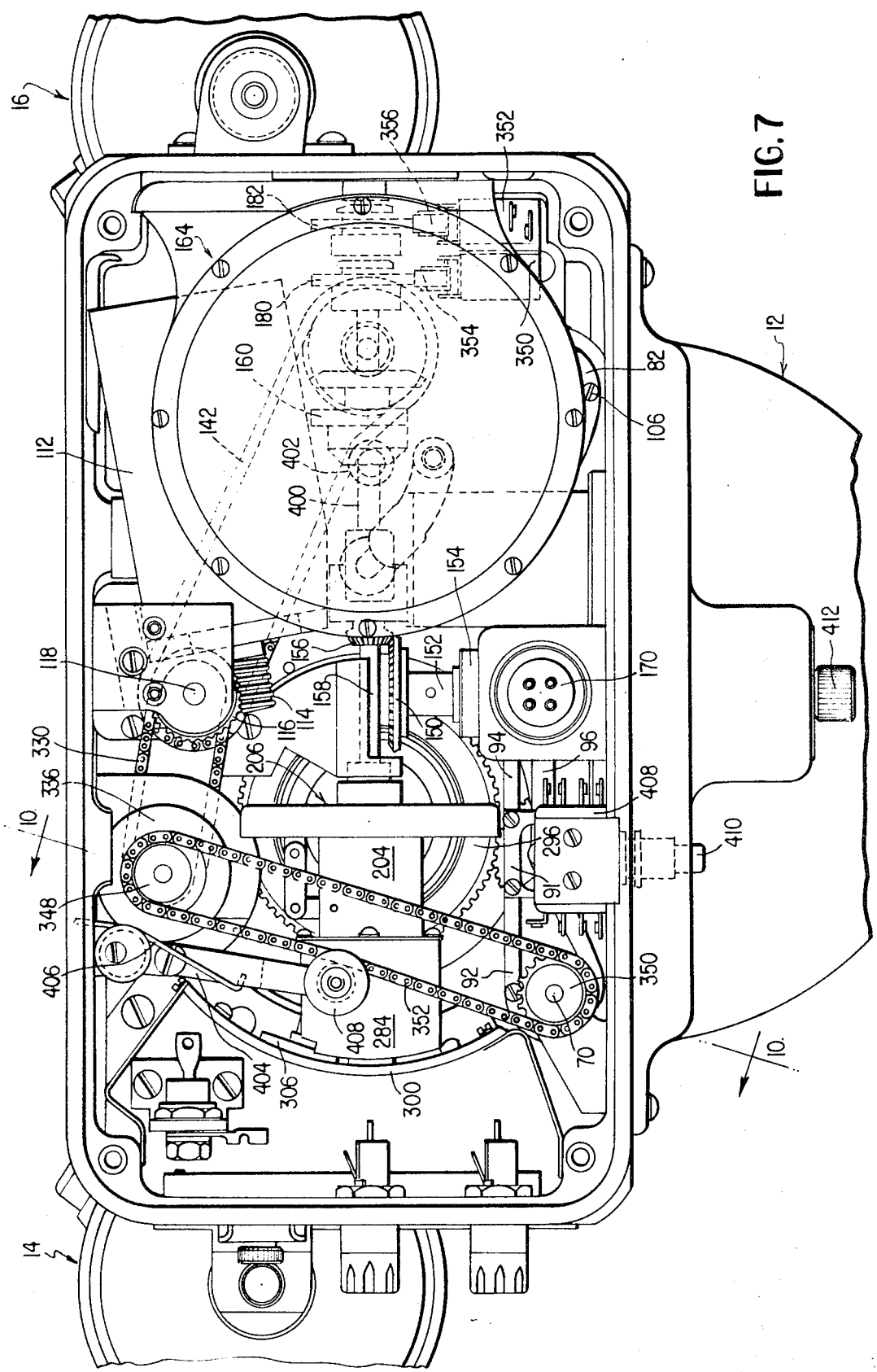
FIG. 7 is a starboard elevation with side cover removed showing further details on the drive assembly and other components of the system.

The aforementioned gear 296 which swings or rotates with the housing 284 is the gear which meshes with the sector 90 previously described in conjunction with FIG. 5, the relationship of the gear 296 and of the sector 90 being illustrated also in FIG. 7.

Figure 10:
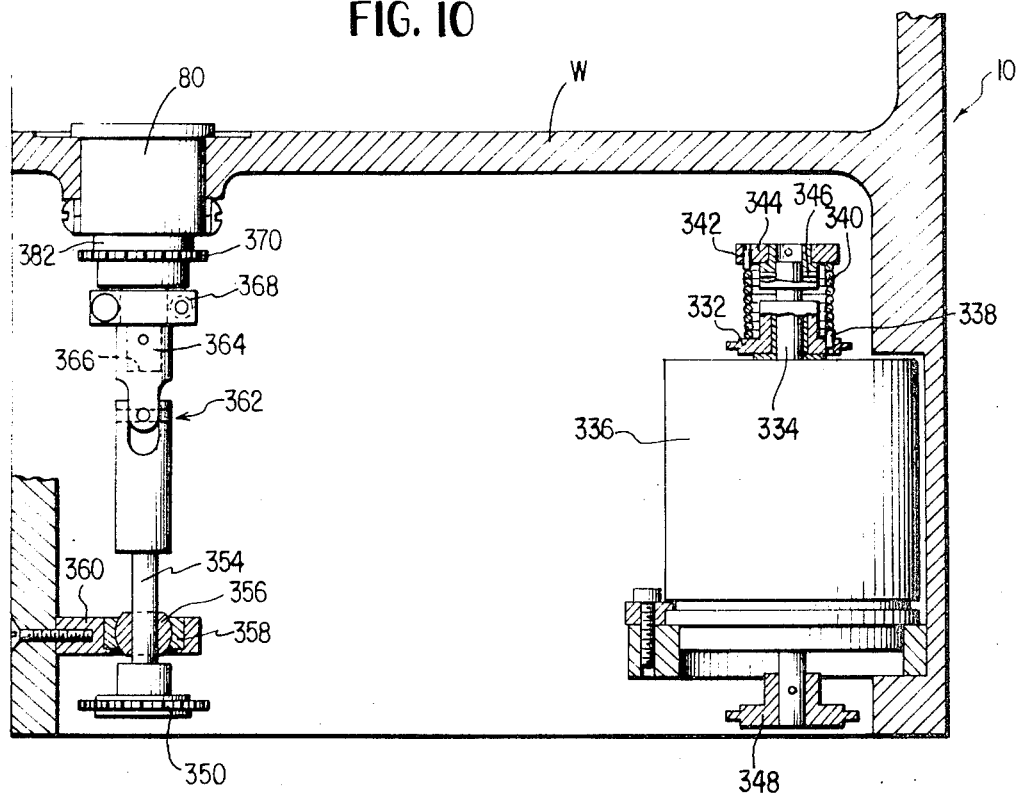
FIG. 10 is an enlarged section taken substantially along the plane of section line 10—10 in FIG. 7.

Referring at this time to FIGS. 7 and 10, and also to FIG. 4 wherein the sprocket 146 on the shaft 118 is shown, it will be noted that a chain 330 is trained over the sprocket 146 and is trained also over the sprocket 332 shown in FIG. 10. The sprocket 332 is journalled on the shaft 334 which passes through the brake device 336 and is coupled therewith through a spring loaded lost motion drive. Thus, one end 338 of a torsion spring 340 is received in an opening in the sprocket 332 and the opposite end 342 of this coiled torsion spring is set into an opening in the drive collar 344. The drive collar is pinned as at 346 to the upper extremity of the shaft 334 and the lower end of this shaft carries the sprocket 348. Aligned with this sprocket 348 is the further sprocket 350 as shown in FIG. 10 and a chain 352 is trained over these two sprockets, see particularly FIG. 7.

The sprocket 350 is fixed to the lower end of the shaft 354 which carries the ball member 356 operating in the spherical bearing or bushing 358 carried by the bracket 360 as shown in FIG. 10 and the upper end of this shaft 354 mounts a universal joint assembly indicated generally by the reference character 362. The upper end 364 of the universal joint is provided with a recess 366 which receives the lower end of the pin or shaft 70 of the film gate means and thus imparts rotary motion thereto. A clamping member 368 of the universal joint assembly 362 receives and clamps the hub of a sprocket 370 so that it, too, rotates with the shaft 354 and with the shaft 70 of the film gate means. It will be evident from FIG. 10 that the arrangement of the shaft 354 and the sprocket 370 coupled to the shaft 70 of the film gate means is such as to impart the necessary drive to the film gate shaft 70 and still allow its motion back and forth in the elongate slot of the guide member 80, it being appreciated that the portion 380 of the shaft 70 is that portion thereof which is received in the slot of the member 80 (see FIG. 3). Thus, the hub portion 382 of the sprocket 370 not only rotates with respect to the member 80, but also slides back and forth with respect thereto. A similar arrangement is provided on the opposite side of the assembly for the guide member 82 except that the shaft member in this case does not require the lower sprocket 350 shown in FIG. 10 but requires only a sprocket identical with that shown at 370 in FIG. 10 with there being a chain trained over these latter two sprockets and which chain is illustrated diagrammatically at 390 in FIG. 8 and with the sprocket 392 associated with the guide member 82 being also shown in FIG. 8.

When the brake 336 is energized, it stops rotation of the shaft 334 and thus rotary drive to the two shafts 70 and 72 of the film gate means 32. The main drive, however, continues to operate and the spring 340 thus winds up tighter during the stopped motion of the shaft 334. This stopping motion is of only brief duration and as soon as the energizing signal to the brake 336 is removed, the additional wind-up of the spring 340 imparts an additional impetus to drive the shafts 70 and 72 very rapidly and thus quickly initiate the film advancing operation. Similarly, the operation of the shutter mechanism is affected. To provide the energizing signal for brake 336 there is provided switch 352 as indicated in FIG. 7, this switch having a follower 356 as shown which is operated by cam 182 previously described. The timing of cam 182 and of the cam 160 for effecting the operation of the suction pump 164 is such as to cause the camera to expose the film at that instant when the film gate means is at its midpoint of travel and, consequently, at maximum velocity and while the film gate means is moving in the forward direction relative to the direction of flight of the aircraft. Just prior to attainment of this interim position, and during the forward motion of the film gate means, the suction pump is actuated as is the switch controlling the brake 336 thereby to arrest temporarily the feeding motion to the film and to capture and hold the film against the grid of the gate by means of the suction effect previously described, the shutter mechanism at this point being released for operation to allow the exposure to be made. Just after the exposure is made, the switch which energizes the brake 336 is opened allowing the advancement of the film and of course, by this time, the suction pump has returned to its initial position.

For the two relatively long chains 142 and 352, slack take-up means may be provided which, as may be seen in FIG. 7, takes the form of a spring pressed arm 400 and idler 402 for the chain 142 and a similarly constructed pivoted arm 404 and spring 406 for the idler 408 operating on the chain 352, as shown. A control switch assembly 409 is provided and a push button 410 associated therewith accessible from the outside of the camera body is provided to control the picture taking process, it being appreciated that the motor 112 is not operated until the button 410 is pressed at which time the cycle of operation is commenced. Two further controls for the camera assembly are illustrated, one being the knob 412 shown in FIG. 7 which controls the shutter to achieve either one of its two speeds as described in the aforesaid copending application relating to the specific details of the shutter mechanism and the other control is the knob 414 shown in FIGS. 4 and 10 which controls the aperture stop for the lens system.

What is claimed is:

1. A camera assembly incorporating image motion compensation, comprising, in combination:

lens means having an optical axis normal to a given plane for producing an image of an object lying in a given object plane on a predetermined focal surface fixed with respect to said object plane and between which object plane and lens means relative motion is occurring along a given path in said given plane;

film gate means for positioning a sensitive film at said focal surface of the lens means;

means for reciprocating said film gate means back and forth relative to said lens means normally along a path parallel to said given object plane and perpendicular to said optical axis;

means for exposing said film during motion of said film gate means; and means for selectively varying the direction of the path of said film gate means relative to the optical axis of said lens means so that said film gate path may be maintained substantially parallel to said object plane when the attitude of said given path is changed with respect to said object plane.

2. A camera assembly as defined in claim 1 including means for feeding fresh film to said film gate means as said film gate means is moving in one direction along its path and for carrying such fresh film with said film gate means as it moves in the opposite direction along its path.

3. A camera assembly as defined in claim 2 wherein the image produced by said lens means is cylindrical, said film gate means includes a cylindrical film-receiving surface and the movement of said film gate means takes place within a plane normal to the axis of said cylindrical film-receiving surface.

4. A camera assembly as defined in claim 3 wherein said means for feeding and for carrying includes suction-producing means for capturing and holding said fresh film against said film-receiving surface.

5. A camera assembly as defined in claim 1 wherein the image produced by said lens means is cylindrical, said film gate means includes a cylindrical film-receiving surface and the movement of said film gate means takes place within a plane normal to the axis of said cylindrical film-receiving surface.

6. A camera assembly as defined in claim 2 wherein said means for feeding and for carrying includes suction-producing means for capturing and holding said fresh film.

7. A camera assembly as defined in claim 1 including means for varying the velocity of movement of said film gate means at that point along its path whereat exposure is effected.

8. A camera assembly as defined in claim 7 including means for feeding fresh film to said film gate means as said film gate means in moving in one direction along its path and for carrying such fresh film with said film gate means as it moves in the opposite direction along its path.

9. A camera assembly as defined in claim 8 wherein the image produced by said lens means is cylindrical, said film gate means includes a cylindrical film-receiving surface and the movement of said film gate means takes place within a plane normal to the axis of said cylindrical film-receiving surface.

10. A camera assembly as defined in claim 9 wherein said means for feeding and for carrying includes suction-producing means for capturing and holding said fresh film against said film-receiving surface.

11. A camera assembly as defined in claim 7 wherein the image produced by said lens means is cylindrical, said film gate means includes a cylindrical film-receiving surface and the movement of said film gate means takes place within a plane normal to the axis of said cylindrical film-receiving surface.

12. A camera assembly as defined in claim 11 wherein said means for feeding and for carrying includes suction-producing means for capturing and holding said fresh film against said film-receiving surface.

13. In a camera assembly particularly suited for aerial photography where a significant component of image motion is present due to the velocity component of an aircraft relative to the ground surface, in combination:

a camera body and optical means fixed to the aircraft for producing instantaneous images of the ground surface on a focal surface which is in fixed position relative to the longitudinal axis of the aircraft and faces downwardly toward the ground surface;

film gate means movable longitudinally of the aircraft with respect to said camera body and optical means having an interim position for presenting a sensitive film area at said fixed focal surface, at alternate of which interim positions said instantaneous images are produced by said optical means;

means for moving said film gate means to pass back and forth longitudinally of the aircraft along a path through said interim position of the film gate means wherein said path along which said film gate means is moved is in a plane parallel to said velocity component of said aircraft; and means for varying the direction of said path through said interim position to follow changes in the inclination of said longitudinal axis of the aircraft with respect to the ground surface.

14. In a camera assembly as defined in claim 13 including means for selectively varying the velocity of said film gate means as it passes through said interim position thereof.

15. In a camera assembly as defined in claim 13 including means for advancing film in said film gate means as said film gate means is moved in one direction through said interim position, and means for holding the film stationary with respect to said film gate means as it is moved in the opposite direction through said interim position.

16. In a camera assembly as defined in claim 15 including means for selectively varying the velocity of said film gate means as it passes through said interim position thereof.

17. In a camera assembly having optical means for intermittently producing an image on a fixed focal surface and film gate means for presenting a photosensitive film area at said focal surface, the combination of:

guide means for allowing said film gate means to move in opposite directions on either side of that interim position at which said film area is presented at said fixed focal surface;

means connected to said film gate means for effecting reciprocatory movement thereof within the confines allowed by said guide means;

means for exposing said film as it is moved through said interim position by said means for effecting movement of said film gate means;

swash plate means connected to said film gate means for effecting movement thereof within the confines allowed by said guide means;

means for driving said swash plate means at a uniform rotational speed; and means for selectively varying the stroke imparted by said swash plate means whereby to vary the instantaneous velocity imparted to said film gate means at said interim position thereof.

18. In a camera assembly having optical means for intermittently producing an image on a fixed focal surface and film gate means for presenting a photosensitive film area at said focal surface, the combination of:

guide means for allowing said film gate means to move in opposite directions on either side of that position at which said film area is presented at said fixed focal surface;

swash plate means connected to said film gate means for effecting reciprocatory movement thereof within the confines allowed by said guide means;

means for selectively varying the stroke imparted by said swash plate means;

a rotatable hub upon which said swash plate means is mounted;

said swash plate means including an outer element and a drive pin carried by said outer element and disposed radially with respect to the axis of rotation of said hub, said drive pin engaging said film gate means;

means for selectively positioning said hub swingably about the axis of said drive pin whereby the stroke imparted by said drive pin is unaffected by such positioning; and means connecting said drive hub to said guide means for altering the path of movement allowed by said guide means in response to said selected positioning of the hub assembly.

19. In a camera assembly as defined in claim 18 including means for advancing film in said film gate means; means for intermittently braking the advancing of the film; and suction means for capturing and holding film to conform to said focal surface during braking of film advance.

20. A camera assembly incorporating image motion compensation, comprising, in combination:

lens means for producing the image of an object at a predetermined focal surface and between which object and lens means relative motion is occurring along a given path;

film gate means for positioning a sensitive film in said focal surface of the lens means;

means for reciprocating said film gate means back and forth across the optical axis of said lens means along a path parallel to said given path;

film supply means adjacent one end of the film gate means path and film take-up means adjacent the other end of the film gate means path;

film drive means disposed between said supply means and said take-up means;

an indefinite length of film in said supply means issuing therefrom into engagement with said drive means, thence through said film gate means back into engagement with said drive means and then into said take-up means to form a film loop between the points of engagement thereof with said drive means and which loop passes through said film gate means with sufficient slack to accommodate the reciprocatory movement of said film gate means;

said drive means including positively interconnected drive elements engaging both ends of said loop and a constant speed drive motor connected to said elements whereby the length of said loop is constant and the feed and take-up of said film from said supply means and to said take-up means respectively are constant;

secondary film drive means on said film gate means for advancing film therethrough;

means for intermittently terminating operation of said secondary drive means; and means on said film gate means for capturing and holding the film therein for transport with the film gate means when the intermittent termination of said secondary drive means occurs.

21. A camera assembly as defined in claim 20 wherein said secondary drive means includes a driven element positively engaging said film, a constantly rotating member, and a resilient coupling connecting said constantly rotating member to said driven element, and wherein said means for intermittently terminating operation of said secondary drive means comprises brake means for intermittently stopping said driven element while causing said resilient coupling torsionally to store drive energy which upon deactivation of said brake means rapidly dissipates and temporarily advances film through said film gate means faster than the subsequent advance effected by said constantly rotating member alone.

* * * * *